US011417874B2

(12) United States Patent
Nikawa et al.

(10) Patent No.: US 11,417,874 B2
(45) Date of Patent: Aug. 16, 2022

(54) NON-AQUEOUS ELECTROLYTE SECONDARY BATTERY

(71) Applicant: HONDA MOTOR CO., LTD., Tokyo (JP)

(72) Inventors: Hidefumi Nikawa, Saitama (JP); Kazuki Saimen, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 17/050,939

(22) PCT Filed: Mar. 12, 2019

(86) PCT No.: PCT/JP2019/009941
§ 371 (c)(1),
(2) Date: Oct. 27, 2020

(87) PCT Pub. No.: WO2019/216018
PCT Pub. Date: Nov. 14, 2019

(65) Prior Publication Data
US 2021/0234156 A1    Jul. 29, 2021

(30) Foreign Application Priority Data

May 7, 2018  (JP) .............................. JP2018-089474

(51) Int. Cl.
*H01M 4/36*    (2006.01)
*H01M 50/531*    (2021.01)
(Continued)

(52) U.S. Cl.
CPC ....... *H01M 4/364* (2013.01); *H01M 10/0562* (2013.01); *H01M 50/531* (2021.01);
(Continued)

(58) Field of Classification Search
CPC ............. H01M 4/364; H01M 10/0562; H01M 50/531; H01M 50/578; H01M 10/0525;
(Continued)

(56) References Cited

U.S. PATENT DOCUMENTS

2003/0198870 A1* 10/2003 Wariishi ............ H01M 10/0567
429/231.1
2018/0233722 A1*  8/2018 Holman .............. H01M 50/557

FOREIGN PATENT DOCUMENTS

JP         11-67275 A    3/1999
JP         11-144704 A   5/1999
(Continued)

OTHER PUBLICATIONS

International Search Report dated May 7, 2019, issued in counterpart International Application No. PCT/JP2019/009941. (1 page).

*Primary Examiner* — Stewart A Fraser
(74) *Attorney, Agent, or Firm* — WHDA, LLP

(57) ABSTRACT

Provided is a non-aqueous electrolyte secondary battery capable of reliably operating an electricity shut-off mechanism at overcharging without deteriorating battery performance. The non-aqueous electrolyte secondary battery (1) includes, in a container (2): a positive electrode (41); in-container positive electrode terminals (21) and (23); a negative electrode (42); in-container negative electrode terminals (22) and (24); a non-aqueous electrolyte solution; and an electricity shut-off mechanism (68*b*) capable of shutting off energization with the outside of the container when the internal pressure of the container rises. A solid electrolyte layer that produces gas allowing the electricity shut-off mechanism (68*b*) to be operated is included in at least one member of a positive electrode mixture layer unformed portion (41*b*), a negative electrode mixture layer unformed portion (42*b*), the in-container positive electrode terminals
(Continued)

(21) and (23), and the in-container negative electrode terminals (22) and (24).

8 Claims, 5 Drawing Sheets

(51) Int. Cl.
*H01M 50/578* (2021.01)
*H01M 10/0562* (2010.01)
*H01M 4/02* (2006.01)

(52) U.S. Cl.
CPC .... *H01M 50/578* (2021.01); *H01M 2004/027* (2013.01); *H01M 2004/028* (2013.01); *H01M 2300/008* (2013.01); *H01M 2300/0077* (2013.01)

(58) Field of Classification Search
CPC ... H01M 10/0587; H01M 4/13; H01M 50/574
See application file for complete search history.

(56) References Cited

FOREIGN PATENT DOCUMENTS

| | | |
|---|---|---|
| JP | 2004-152619 A | 5/2004 |
| JP | 2013-69490 A | 4/2013 |
| JP | 2017-16796 A | 1/2017 |
| WO | 2014/049848 A1 | 4/2014 |

\* cited by examiner

NON-AQUEOUS ELECTROLYTE SECONDARY BATTERY

TECHNICAL FIELD

The present invention relates to a non-aqueous electrolyte secondary battery.

BACKGROUND ART

Conventionally, known is a non-aqueous electrolyte secondary battery comprising: a positive electrode having a positive electrode mixture layer and positive electrode current collector; a negative electrode having a negative electrode mixture layer and a negative electrode current collector; and a non-aqueous electrolyte solution in a container. In the above non-aqueous electrolyte secondary battery, for example, lithium ion is used as a charge carrier responsible for the battery reaction.

When the non-aqueous electrolyte secondary battery is in an overcharged state, the non-aqueous solvent and the like of the electrolytic solution are electrolyzed to generate gas, and the internal pressure rises. Known is a non-aqueous electrolyte secondary battery comprising an electricity shut-off mechanism for shutting off energization between a positive electrode or a negative electrode and the outside when the internal pressure rises due to overcharging (for example, refer to Patent Literature 1).

In addition, known is a non-aqueous electrolyte secondary battery including a gas generating agent, in an electrolytic solution, to produce gas by reacting with a voltage equal to or more than the maximum operating power of the non-aqueous electrolyte secondary battery to ensure that the above electricity shut-off mechanism operates during overcharging (for example, refer to Patent Literature 2). According to the non-aqueous electrolyte secondary battery including the above gas generating agent in the electrolytic solution, before the generation of gas by electrolysis of the above non-aqueous solvent and the like, the gas generated from the above gas generating agent increases the internal pressure of the non-aqueous electrolyte secondary battery, thereby allowing the above electricity shut-off mechanism to be reliably operated at overcharging.

CITATION LIST

Patent Literature

Patent Literature 1: International Publication No. WO 2014/049848
Patent Literature 2: Japanese Patent Laid-Open No. 2013-69490

SUMMARY OF INVENTION

Technical Problem

However, the non-aqueous electrolyte secondary battery described in Patent Literature 2 has a disadvantage of deteriorating battery performance such as input-output characteristics and energy density since the above gas generating agent is added to the electrolytic solution and the gas generating agent inhibits the battery reaction.

In addition, in the non-aqueous electrolyte secondary battery, the above gas generating agent may be added to a positive electrode mixture layer or a negative electrode mixture layer, but in this case, there is a concern that the generated gas is confined in the positive electrode mixture layer or the negative electrode mixture layer to fail to operate the above electricity shut-off mechanism.

The object of the present invention is to eliminate such disadvantage and to provide a non-aqueous electrolyte secondary battery capable of reliably operating the electricity shut-off mechanism at overcharging without deteriorating the battery performance.

Solution to Problem

In order to achieve such an object, a non-aqueous electrolyte secondary battery of the present invention comprises, in a container: a positive electrode having a positive electrode mixture layer and a positive electrode current collector; an in-container positive electrode terminal that is electrically connected to a positive electrode mixture layer unformed portion of the positive electrode current collector; a negative electrode having a negative electrode mixture layer and a negative electrode current collector; an in-container negative electrode terminal that is electrically connected to a negative electrode mixture layer unformed portion of the negative electrode current collector; a non-aqueous electrolyte solution; and an electricity shut-off mechanism capable of shutting off energization between the in-container positive electrode terminal or the in-container negative electrode terminal and the outside of the container when the internal pressure of the container rises, wherein a solid electrolyte layer that produces gas is comprised in at least one member selected from the group consisting of the positive electrode mixture layer unformed portion, the negative electrode mixture layer unformed portion, the in-container positive electrode terminal, and the in-container negative electrode terminal, the gas allowing the electricity shut-off mechanism to be operated by reacting with a voltage equal to or more than the maximum operating power of the non-aqueous electrolyte secondary battery and then by raising the internal pressure of the container.

According to the non-aqueous electrolyte secondary battery of the present invention, when the battery voltage becomes a voltage equal to or more than the maximum operating power of the non-aqueous electrolyte secondary battery due to overcharging, the gas is produced by the reaction of the solid electrolyte layer to increase the internal pressure of the container. As a result, the electricity shut-off mechanism operates to shut off the energization between the in-container positive electrode terminal or the in-container negative electrode terminal and the outside of the container, thereby allowing overcharging to be prevented.

At this time, in the non-aqueous electrolyte secondary battery of the present invention, the solid electrolyte layer is comprised in at least one member selected from the group consisting of the positive electrode mixture layer unformed portion, the negative electrode mixture layer unformed portion, the in-container positive electrode terminal, and the in-container negative electrode terminal.

Therefore, the above solid electrolyte layer can prevent the battery performance such as energy density from deteriorating without hindering the battery reaction in the above positive electrode mixture layer, the above negative electrode mixture layer, or the above non-aqueous electrolyte solution. In addition, since the gas produced by the above solid electrolyte layer is not confined in the above positive electrode mixture layer or the above negative electrode mixture layer, the above electricity shut-off mechanism can be reliably operated.

DESCRIPTION OF EMBODIMENTS

Hereinafter, embodiments of the present invention will be described in more detail with reference to the accompanying drawings.

Figure 1:
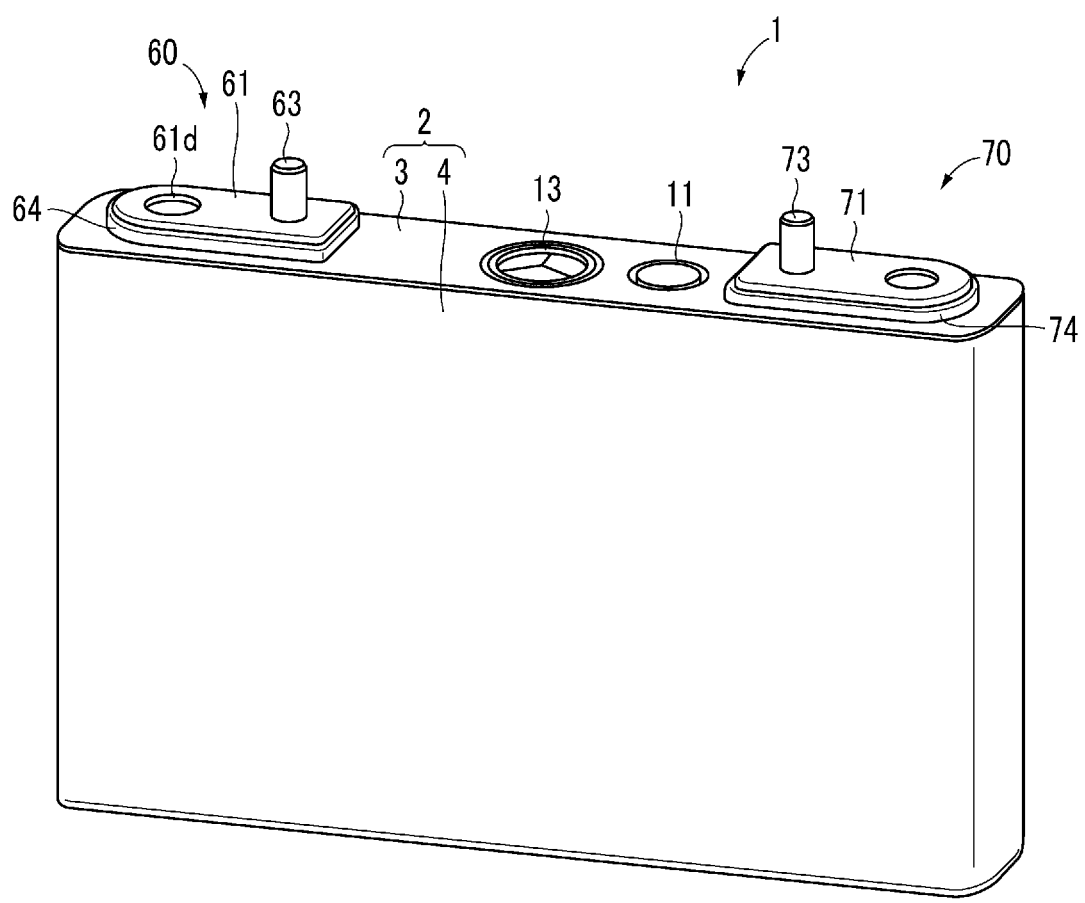
FIG. 1 is a perspective view showing a configuration example of a non-aqueous electrolyte secondary battery of the present embodiment.
Figure 2:
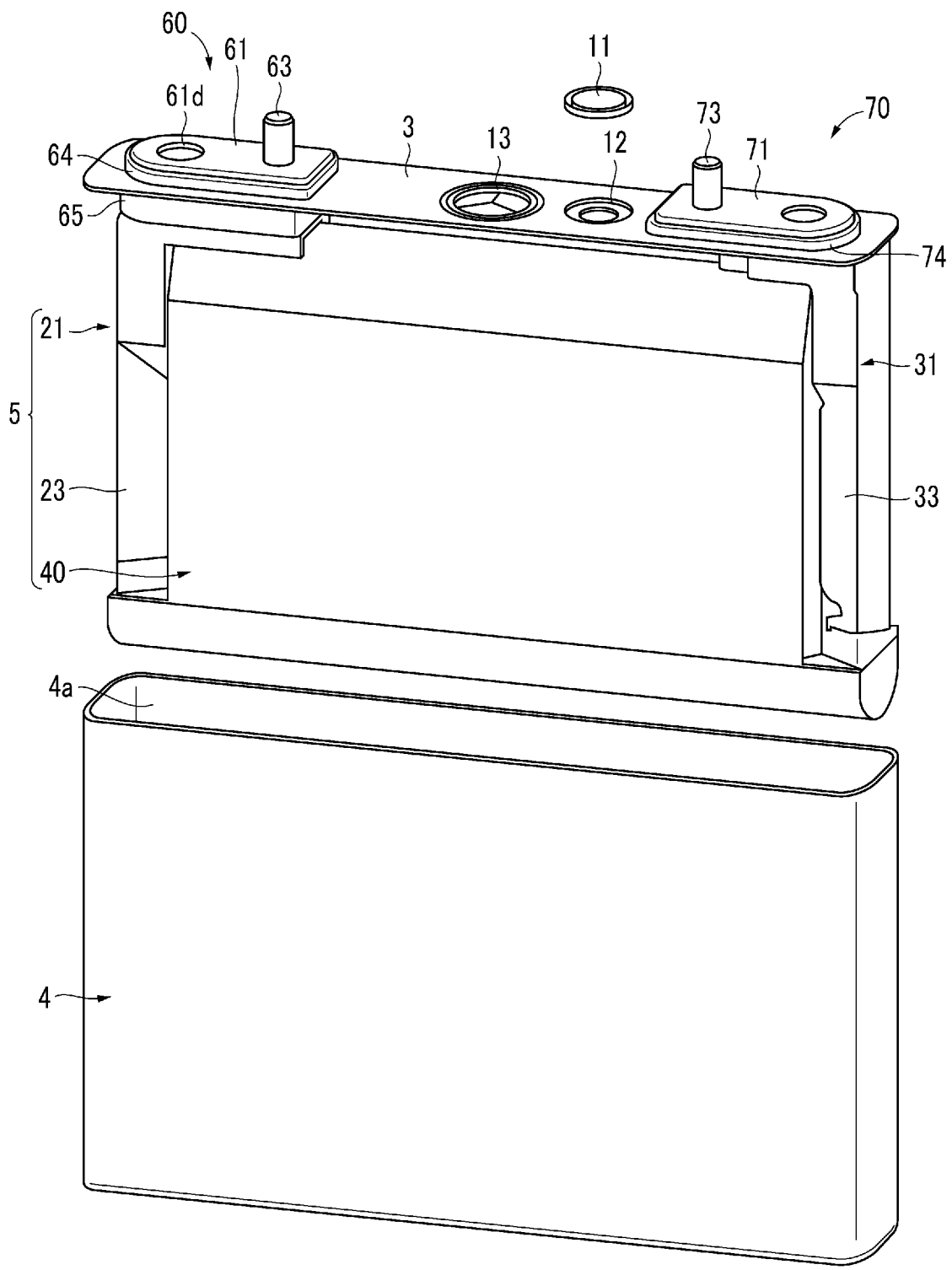
FIG. 2 is an exploded perspective view of the non-aqueous electrolyte secondary battery shown in FIG. 1.

As shown in FIGS. 1 and 2, the non-aqueous electrolyte secondary battery 1 of the present embodiment comprises a battery container 2 having a battery can 4 having a square deep shape and a battery lid 3 for sealing the opening 4a of the battery can 4. A power generation element is housed in the battery container 2. The power generation element has an electrode body element 40 that is wound flat in a state where separators 43 and 44 are interposed between a positive electrode 41 and a negative electrode 42 and are overlapped with each other. The electrode body element 40 is inserted into the battery can 4 together with a positive electrode current collector plate 21 and a negative electrode current collector plate 31 in a state of being covered with an insulating sheet (not shown) from the outside thereof.

Both the battery can 4 and the battery lid 3 are made of an aluminum alloy, and the battery lid 3 is joined to the battery can 4 by laser welding to seal the opening 4a. The battery lid 3 is provided with a positive electrode side terminal component 60 and a negative electrode side terminal component 70 to form a lid assembly.

The positive electrode side terminal component 60 and the negative electrode side terminal component 70 have a positive electrode terminal 61 and a negative electrode terminal 71, respectively, arranged between the battery lid 3 and each component via the first insulators 64 and 74, respectively. In addition to the positive electrode terminal 61 and the negative electrode terminal 71, in the battery lid 3, arranged are a gas discharge valve 13 to be opened when the pressure in the battery container 2 rises above a predetermined value and then to discharge the gas in the battery container 2, a liquid injection port 12 for injecting an electrolytic solution into the battery container 2, and a liquid injection plug 11 to seal the liquid injection port 12 after injecting the electrolytic solution. The liquid injection plug 11 is joined to the battery lid 3 by laser welding with the liquid injection port 12 closed to seal the liquid injection port 12.

The positive electrode terminal 61 and the negative electrode terminal 71 are arranged in the outside of the battery lid 3 having a rectangle and at positions separated from each other, i.e., in one side and the other side in the direction along the long sides, respectively. The positive electrode terminal 61 and the negative electrode terminal 71 hold terminal bolts 63 and 73 for fixing the bus bar connection terminals, are arranged inside of the battery lid 3, and are conductively connected. The positive electrode terminal 61 is made of aluminum or an aluminum alloy, and the negative electrode terminal 71 is made of a copper alloy.

A gasket 66 and a first insulator 64 are interposed on the outside of the battery lid 3, and a second insulator 65 is interposed inside the battery lid 3 (refer to FIG. 4), and thus the positive electrode terminal 61 is electrically insulated from the battery lid 3. The positive electrode terminal 61 is crimped together with the second insulator 65 and a connection electrode 67, and is fixed to the battery lid 3.

The positive electrode terminal 61 is electrically connected to the positive electrode current collector plate 21 via the electricity shut-off mechanism. The details of the configuration of the electricity shut-off mechanism will be described later. The negative electrode terminal 71 is electrically connected to the negative electrode current collector plate 31 via a connection terminal (not shown).

The positive electrode current collector plate 21 and the negative electrode current collector plate 31 have a pair of flat joint pieces 23 and 33 extending toward the bottom of the battery can 4 and conductively connected to the electrode body element 40. The positive electrode current collector plate 21 and the joint piece 23 constitute the in-container positive electrode terminal; and the negative electrode current collector plate 31 and the joint piece 33 constitute the in-container negative electrode terminal. The joint pieces 23 and 33 are joined to the positive electrode 41 and the negative electrode 42, respectively, provided at both ends in the winding axis direction of the electrode body element 40 by welding. As the welding method, ultrasonic welding, resistance welding, laser welding, and the like can be used.

The electrode body element 40 is arranged between the joint piece 23 of the positive electrode current collector plate 21 and the joint piece 33 of the negative electrode current collector plate 31 and is supported at both ends, and a power generation element assembly 5 is composed of the lid assembly and the electrode body element 40.

Figure 3:
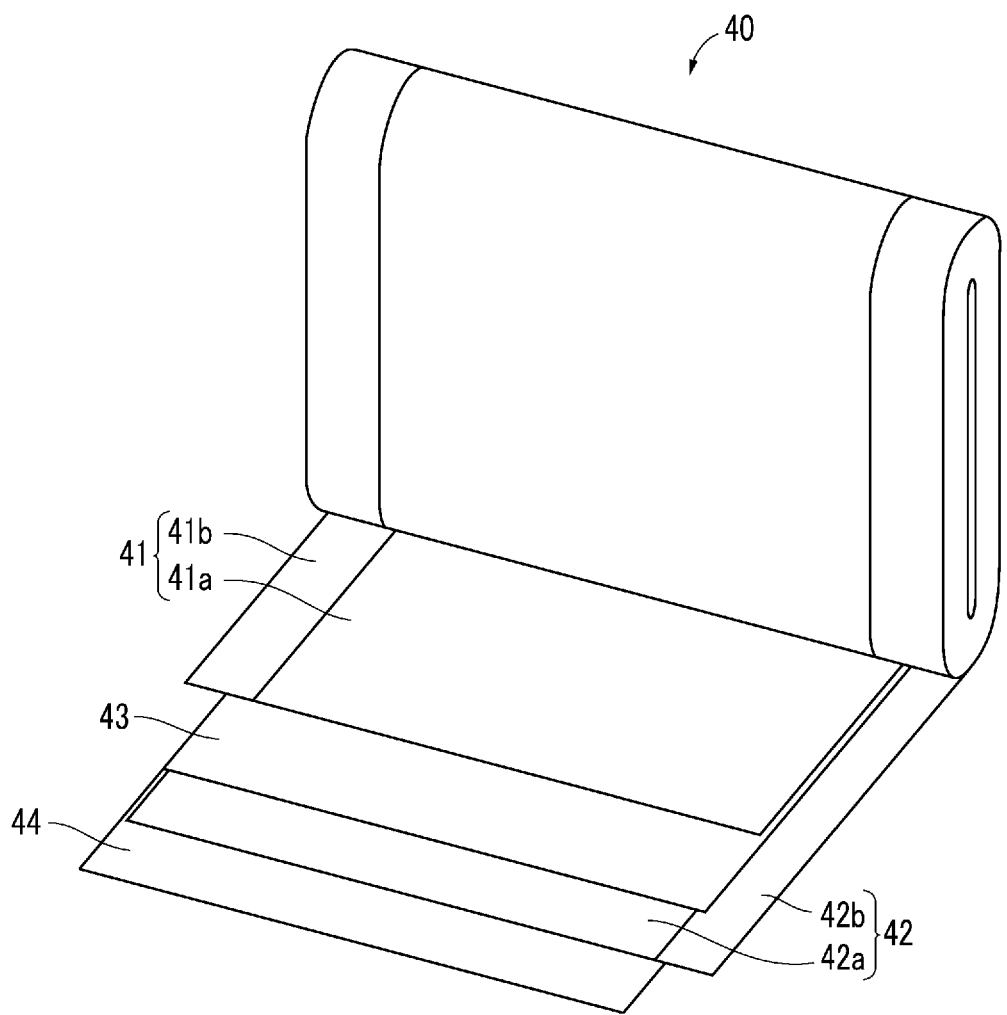
FIG. 3 is an exploded perspective view of the electrode body element of the non-aqueous electrolyte secondary battery shown in FIG. 1.

As shown in FIG. 3 with the winding end side unfolded, the electrode body element 40 is configured by arranging the negative electrode 42 and the positive electrode 41 between the first and second separators 43 and 44, respectively, and winding them flat. The positive electrode 41 comprises a positive electrode mixture layer 41a formed on a positive electrode current collector (not shown) and a positive electrode mixture layer unformed portion 41b, and the negative electrode 42 comprises a negative electrode mixture layer 42a formed on a negative electrode current collector (not shown) and a negative electrode mixture layer unformed portion 42b. As shown in FIG. 3, in the electrode body element 40, the outermost electrode is the negative electrode 42, and the separator 44 is wound around the negative electrode 42.

The separators 43 and 44 have a role of insulating the positive electrode 41 and the negative electrode 42. The negative electrode mixture layer 42a of the negative electrode 42 is larger in the width direction than the positive electrode mixture layer 41a of the positive electrode 41, so that the positive electrode mixture layer 41a is configured to be always sandwiched by the negative electrode mixture layer 42a.

The positive electrode mixture layer unformed portion 41b and the negative electrode mixture layer unformed portion 42b are bundled on a flat surface and connected by welding or the like to the positive electrode current collector plate 21 and the negative electrode current collector plate 31 of each electrode connected to the positive electrode terminal 61 and the negative electrode terminal 71. The separators 43 and 44 are wider than the negative electrode mixture layer 42a in the width direction, and are wound at the position where the metal foil surface is exposed on the positive electrode mixture layer unformed portion 41b and the negative electrode mixture layer unformed portion 42b, thereby which does not hinder the case of bundling and welding.

In the present embodiment, the electrode body element 40 is configured by arranging each of a long negative electrode 42 and a long positive electrode 41 between the long first and second separators 43 and 44 and winding flat, and the electrode body element 40 may be configured by regarding one obtained by arranging the first separator 43 between the strip-shaped positive electrode 41 and negative electrode 42 as an unit, laminating a plurality of units, and arranging the second separator 44 between the units.

Figure 4:
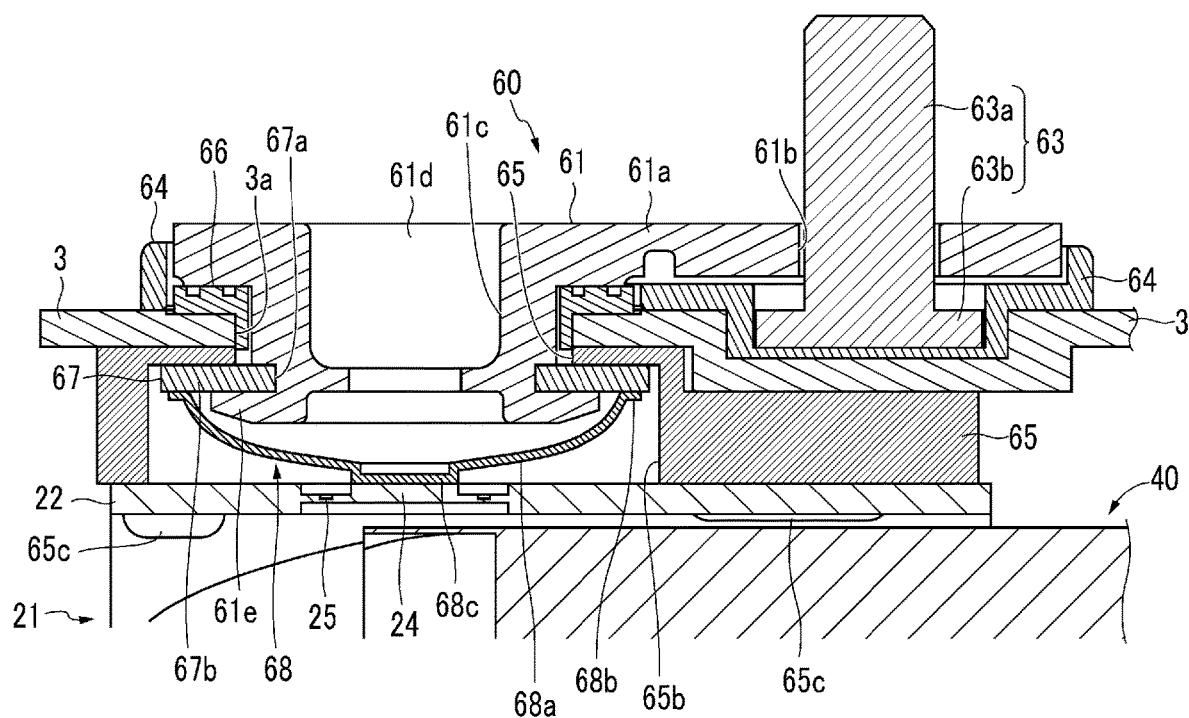
FIG. 4 is a partial sectional view showing the configuration of the electricity shut-off mechanism of the non-aqueous electrolyte secondary battery shown in FIG. 1.
Figure 5:
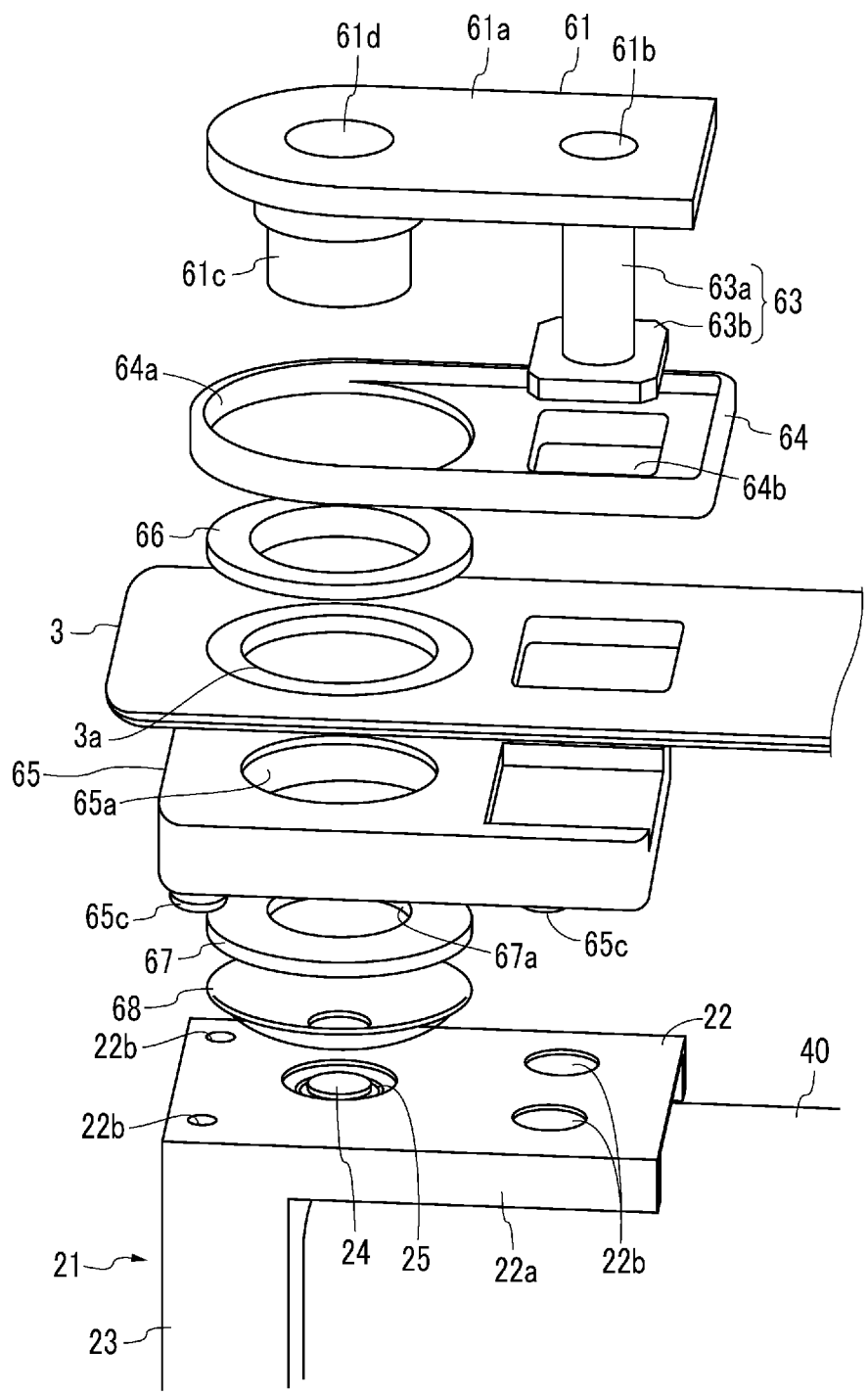
FIG. 5 is an exploded perspective view of the component of the configuration shown in FIG. 4.

The details of the electricity shut-off mechanism will be described with reference to FIGS. 4 and 5.

The electricity shut-off mechanism is provided in the current path from the positive electrode terminal 61 of the positive electrode side terminal component 60 to the positive electrode current collector plate 21.

The positive electrode side terminal component 60 is composed of the positive electrode terminal 61, a positive electrode terminal bolt 63, the first insulator 64, the second insulator 65, the gasket 66, the positive electrode connection electrode 67, a conductive plate 68 to be deformed by an increase in battery internal pressure, and the positive electrode current collector plate 21. The positive electrode terminal 61, the first insulator 64, the second insulator 65, the gasket 66, and the positive electrode connection electrode 67 are integrally crimped and fixed at the inner end surface of the battery of the positive electrode terminal 61 and is attached to the battery lid 3. The positive electrode current collector plate 21 is integrally fixed to the second insulator 65.

The positive electrode terminal 61 has a plate-shaped main body 61a arranged along the upper surface corresponding to the outside of the battery lid 3, a bolt insertion hole 61b that penetrates the main body 61a and supports inserting of a positive electrode terminal bolt 63, and a shaft portion 61c that inserts into the opening 3a of the battery lid 3 and projects inward of the battery lid 3, and the shaft portion 61c is provided with a through hole 61d that penetrates in the axial direction along the center thereof.

The positive electrode terminal bolt 63 has a shaft portion 63a inserted into the bolt insertion hole 61b of the positive electrode terminal 61 and the head portion (flat bottom portion) 63b supported by being interposed between the main body 61a and the first insulator 64.

The first insulator 64 is composed of an insulating plate-like member interposed between the positive electrode terminal 61 and the upper surface of the battery lid 3, and has the opening 64a (refer to FIG. 5) for communicating with the opening 3a of the battery lid 3 and inserting the shaft portion 61c of the positive electrode terminal 61.

The gasket 66 is inserted into the opening 3a of the battery lid 3 to insulate and seal the interval between the shaft portion 61c of the positive electrode terminal 61 and the battery lid 3.

The positive electrode connection electrode 67 is composed of a conductive flat plate member arranged inside the battery lid 3, and at the central position thereof, provided is an opening 67a for communicating with the opening 3a of the battery lid 3 and inserting the shaft portion 61c of the positive electrode terminal 61. The positive electrode connection electrode 67 is arranged along the lower surface of the battery lid 3 with the second insulator 65 interposed between the battery lid 3 and the positive electrode connection electrode 67, and the opening 67a opens on a flat lower surface (flat portion) 67b, and is integrally fixed to the battery lid 3 in a state of being electrically connected to the positive electrode terminal 61 and insulated from the battery lid 3 by radially outward expanding and crimping the tip of the shaft portion 61c of the positive electrode terminal 61 protruding from the opening 67a. A crimped portion 61e of the shaft portion 61c of the positive electrode terminal 61 projects from the lower surface 67b of the positive electrode connection electrode 67, and a through hole 61d communicating with the outside of the battery opens toward the inside of the battery.

The second insulator 65 is composed of an insulating plate-like member arranged along the lower surface of the battery lid 3, and is interposed between the battery lid 3 and the positive electrode connection electrode 67 and between the battery lid 3 and the positive electrode current collector plate 21 to insulate between them. The second insulator 65 has a predetermined plate thickness, and provided is the through hole 65a communicating with the opening 3a of the battery lid 3 and being inserted by the shaft portion 61c of the positive electrode terminal 61. The second insulator 65 is integrally crimped and fixed to the battery lid 3 together with the positive electrode connection electrode 67 by the crimped portion 61e.

The second insulator 65 is provided with a recess 65b that communicates with the through hole 65a and accommodates the positive electrode connection electrode 67 and the conductive plate 68. The recess 65b is recessed in the lower surface of the second insulator 65 and communicates with another space inside the battery.

The conductive plate 68 has a dome-shaped diaphragm portion 68a that gradually shrinks in diameter along the axial direction, and a ring-shaped flange portion 68b that expands radially outward from the outer peripheral edge portion of the diaphragm portion 68a. The diaphragm portion 68a gradually shrinks in diameter from the lower surface 67b of the positive electrode connection electrode 67 to the separating direction in the axial direction, and has a curved surface portion having a convex arc shape in cross section in at least one part in the axial direction, and the present embodiment has a hemispherical shape having a semi-elliptical cross section. The diaphragm portion 68a faces and covers the opening end of the through hole 61d that opens in the lower surface 67b of the positive electrode connection electrode 67, and the flange portion 68b is joined to the lower surface 67b of the positive electrode connection electrode 67 to perform sealing, and thus partitioning between the space outside the battery communicating with the through hole 61d and the space inside the battery.

When the internal pressure of the battery container 2 rises above the preset upper limit value, the diaphragm portion 68a serves as the electricity shut-off mechanism of the present invention by deforming in a direction in which the protruding height becomes lower due to the pressure difference between the battery container 2 and the outside, breaking the fragile portion 25 of the positive electrode current collector plate 21, separating the joint portion 24 with the conductive plate 68 from a base portion 22 of the positive electrode current collector plate 21, and shutting off the current path.

The flange portion 68b provided on the outer peripheral edge portion of the diaphragm portion 68a spreads along one plane toward the outside in the radial direction, is continuous with a constant width over the entire circumference, has a ring shape that contacts the lower surface of the positive electrode connection electrode 67, and is closely sealed by continuously joining to the lower surface 67b of the positive electrode connection electrode 67 by laser welding of the entire circumference.

Material, plate thickness, cross-sectional shape, and the like of the diaphragm portion 68a are set so that the joint portion 24 is held at a position separated from the positive electrode current collector plate 21 by plastic deformation after the internal pressure of the battery container 2 decreases. A central portion 68c, which is the top of the diaphragm portion 68a, is joined to the joint portion 24 of the positive electrode current collector plate 21 by laser welding. The central portion 68c may be joined by resistance welding or ultrasonic welding in addition to laser welding.

The positive electrode current collector plate 21 is attached to and fixed to the second insulator 65. As shown in FIG. 5, the positive electrode current collector plate 21 has a flat plate-shaped base portion (upper flat portion) 22 extending in parallel and facing the lower surface of the battery lid 3, and is formed by penetrating so that a plurality of support holes 22b are arranged at predetermined intervals from each other. The base portion 22 is provided with a pair of edges 22a formed by bending along a pair of long sides in a direction away from the battery lid 3, for improving the rigidity so as to maintain a planar shape. A pair of joint pieces 23 of the positive electrode current collector plate 21 are provided so as to continuously project to each edge 22a.

The positive electrode current collector plate 21 is joined to the second insulator 65 and fixed integrally by inserting a plurality of convex portions 65c projecting from the lower surface of the second insulator 65 into the respective support holes 22b of the base portion 22, and then by heat-welding the tip of the convex portion 65c.

The positive electrode current collector plate 21 is provided with a joint portion 24 that is joined to the central portion 68c of the conductive plate 68. The joint portion 24 is composed of a thin-walled portion obtained by thinning a part of the base portion 22. The fragile portion 25 is configured by providing a groove portion in a thin-walled portion so as to surround the periphery of the joint portion 24, and is shut off at the groove by the conductive plate 68 that deforms outward from the battery after the increase in the internal pressure of the battery so that the joint portion 24 can be separated from the base portion 22.

Dimensions, shape, and the like of the fragile portion 25 are set so that the fragile portion 25 breaks when the force in the pulling direction acts on the battery lid 3 side in the deformation of the conductive plate 68 due to the increase in the internal pressure of the battery container 2, but has a strength that leads to no breaking under normal usage environments such as vibration during running. The central portion 68c of the conductive plate 68 and the joint portion 24 of the positive electrode current collector plate 21 are joined by laser welding, but resistance welding, ultrasonic welding and the like are also possible.

In the non-aqueous electrolyte secondary battery 1 of the present embodiment, a solid electrolyte layer (not shown) that generates gas by the reaction when the battery voltage is equal to or more than the maximum operating power of the non-aqueous electrolyte secondary battery 1 is provided on at least one member selected from the group consisting of the positive electrode mixture layer unformed portion 41b, the negative electrode mixture layer unformed portion 42b, the in-container positive electrode terminal (the positive electrode current collector plate 21 and joint piece 23), or the in-container negative electrode terminal (the negative electrode current collector plate 31 and joint piece 33). The above electricity shut-off mechanism operates by increase in the internal pressure of the battery container 2 due to the gas generated by the reaction of the above solid electrolyte layer.

In the non-aqueous electrolyte secondary battery 1 of the present embodiment, the positive electrode 41 is composed of a positive electrode current collector, the positive electrode mixture layer 41a formed on one side or both sides of the positive electrode current collector, and the positive electrode mixture layer unformed portion 41b.

As the above positive electrode current collector, a material such as a foil or plate of copper, aluminum, nickel, titanium, or stainless steel, carbon sheet, carbon nanotube sheet can be used singly. In addition, as the above positive electrode current collector, a metal clad foil or the like composed of two or more materials may be used as necessary. The above positive electrode current collector can have a thickness of 5 to 100 μm, but preferably has a thickness of 7 to 20 μm from the viewpoint of structure and performance.

The positive electrode mixture layer 41a contains a positive electrode active material, a conductive aid, and a binder. The above positive electrode active material that can be used is at least one material selected from lithium composite oxide ($LiNi_xCo_yMn_zO_2$ (x+y+z=1), $LiNi_xCo_yAl_zO_2$ (x+y+z=1)), lithium iron phosphate ($LiFePO_4$ (LFP)), and the like.

The above conductive aid that can be used is at least one material selected from carbon black such as acetylene black (AB) and Ketjen black (KB), carbon material such as graphite powder, conductive metal powder such as nickel powder, and the like.

The above binder that can be used is at least one material selected from cellulosic polymers, fluororesins, vinyl acetate copolymers, rubbers, and the like. Specifically, the above binder that can be used is at least one material selected from polyvinylidene fluoride (PVdF), polyimide (PI), polyvinylidene chloride (PVdC), polyethylene oxide (PEO), and the like.

The positive electrode mixture layer 41a can be formed by applying a positive electrode mixture slurry obtained by mixing the above positive electrode active material, the above conductive aid, and the above binder with an organic solvent such as N-methylpyrrolidone (NMP) to one side or both sides of the above positive electrode current collector, and then drying it. The above drying may be performed under reduced pressure.

The positive electrode mixture layer 41a is pressed appropriately after the above drying, thereby allowing the thickness and density to be adjusted. The positive electrode mixture layer 41a formed on the above positive electrode current collector preferably has a density of 2.0 to 4.2 $g/cm^3$, and more preferably 2.6 to 3.2 $g/cm^3$, from the viewpoint of improving the balance between energy density and input-output characteristics.

The negative electrode 42 is composed of a negative electrode current collector, the negative electrode mixture layer 42a formed on one side or both sides of the negative electrode current collector, and the negative electrode mixture layer unformed portion 42b.

As the above negative electrode current collector, a material such as a foil or plate of copper, aluminum, nickel, titanium, or stainless steel, carbon sheet, carbon nanotube sheet, or the like can be used singly. In addition, as the above negative electrode current collector, a metal clad foil or the like composed of two or more materials may be used as necessary. The above negative electrode current collector can have a thickness of 5 to 100 µm, but preferably has a thickness of 7 to 20 µm from the viewpoint of structure and performance.

The negative electrode mixture layer 42a contains a negative electrode active material, a conductive aid, and a binder. The above negative electrode active material that can be used is at least one material selected from carbon powder (amorphous carbon) such as soft carbon (easily graphitized carbon), hard carbon (hardly graphitized carbon), and graphite, silica ($SiO_x$), titanium composite oxide ($Li_4Ti_5O_7$, $TiO_2$, $Nb_2TiO_7$), tin composite oxide, lithium alloy, metallic lithium, and the like.

The above conductive aid that can be used is at least one material selected from carbon black such as acetylene black (AB) and Ketjen black (KB), carbon material such as graphite powder, conductive metal powder such as nickel powder, and the like.

The above binder that can be used is at least one material selected from cellulosic polymers, fluororesins, vinyl acetate copolymers, rubbers, and the like. As the binder when an organic solvent is used as the solvent of the negative electrode mixture slurry described later, specifically, at least one material selected from polyvinylidene fluoride (PVdF), polyimide (PI), polyvinylidene chloride (PVdC), polyethylene oxide (PEO), and the like can be used. In addition, as the above binder when an aqueous solvent is used as the solvent of the negative electrode mixture slurry, specifically, at least one material selected from styrene-butadiene rubber (SBR), acrylic acid-modified SBR resin (SBR-based latex), carboxymethyl cellulose (CMC), polyvinyl alcohol (PVA), polytetrafluoroethylene (PTFE), hydroxypropylmethyl cellulose (HPMC), tetrafluoroethylene-hexa fluoropropylene copolymer (FEP) or the like can be used.

The negative electrode mixture layer 42a can be formed by applying a negative electrode mixture slurry obtained by mixing the above negative electrode active material, the above conductive aid, and the above binder with an organic solvent such as N-methylpyrrolidone (NMP) or an aqueous solvent such as pure water to one side or both sides of the above negative electrode current collector, and then drying it. The above drying may be performed under reduced pressure.

The negative electrode mixture layer 42a is pressed appropriately after the above drying, thereby allowing the thickness and density to be adjusted. The negative electrode mixture layer 42a formed on the above negative electrode current collector preferably has a density of 0.7 to 2.0 g/cm³, and more preferably 1.0 to 1.7 g/cm³, from the viewpoint of improving the balance between energy density and input-output characteristics.

The above solid electrolyte layer that produces the gas contains a solid electrolyte, a conductive aid, or a binder. The above conductive aid or the binder that can be used is the same one used for the positive electrode mixture layer 41a or the negative electrode mixture layer 42a.

A solid electrolyte that can be used for the above solid electrolyte layer is at least one material selected from, for example, LiF, LiCl, LiI, $Li_2O$, $Li_2S$, $Li_3N$, $Li_3P$, $Li_{10}GeP_2S_{12}$ (LGPS), $Li_3PS_4$, $Li_6PS_5Cl$, $Li_7P_2S_8I$, $Li_xPO_yN_z$ (x=2y+3z−5, LiPON), $Li_7La_3Zr_2O_{12}$ (LLZO), $Li_{3x}La_{2/3-x}TiO_3$ (LLTO), $Li_{1+x}Al_xTi_{2-x}(PO_4)_3$ (LATP), $Li_{1.5}Al_{0.5}Ge_{1.5}(PO_4)_3$ (LAGP), $Li_{1+x+y}Al_xTi_{2-x}Si_yP_{3-y}O_{12}$, $Li_{1+x+y}Al_x(Ti, Ge)_{2-x}Si_yP_{3-y}O_{12}$, and $Li_{4-2x}Zn_xGeO_4$ (LISICON).

In general, the electrochemical stability of a solid electrolyte varies from material to material, and the stable region is defined as an electrochemical window. The above solid electrolyte can be used as a gas generator, since the solid electrolyte itself is decomposed or modified by a change in crystal structure in the high-potential region or low-potential region outside the potential window, and at that time, the element in the structure is generated as gas depending on the composition. Moreover, in the high-potential region or the low-potential region outside the potential window, the above solid electrolyte can be used as a gas generator, since the solid electrolyte or the modified solid electrolyte reacts with the positive electrode active material or the negative electrode active material, the conductive aid, the binder, and the electrolytic solution at the interface, and the solid electrolyte, the positive electrode active material or the negative electrode active material, the conductive aid, the binder, and the electrolytic solution are decomposed to generate gas.

The above solid electrolyte layer can be formed by applying a solid electrolyte slurry obtained by mixing the above solid electrolyte with a conductive aid or a binder in an organic solvent such as N-methylpyrrolidone (NMP) to at least one member selected from the group consisting of the positive electrode mixture layer unformed portion 41b, the negative electrode mixture layer unformed portion 42b, the in-container positive electrode terminal (positive electrode current collector plate 21 and joint piece 23), or the in-container negative electrode terminal (negative electrode current collector plate 31 and joint piece 33), and then drying it. The above drying may be performed under reduced pressure.

For the above solid electrolyte layer, LAGP, LLZO, or LATP is preferably used as the above solid electrolyte from the viewpoint of the potential window, when the solid electrolyte layer is formed on the positive electrode mixture layer unformed portion 41b or the positive electrode current collector plate 21. LAGP, LLZO, or LATP has an upper limit potential near the positive electrode potential and therefore is stable in the normal range, and can easily generate gas at overcharging.

In addition, for the above solid electrolyte layer, LISICON is preferably used as the above solid electrolyte from the viewpoint of the potential window, when the solid electrolyte layer is formed on the negative electrode mixture layer unformed portion 42b or the negative electrode current collector plate 31. LISICON has a lower limit potential near the negative electrode potential and therefore is stable in the normal range, and can easily generate gas at overcharging.

As the above electrolytic solution, one containing a non-aqueous solvent and an electrolyte can be used, and the concentration of the electrolyte is preferably in the range of 0.1 to 10 mol/L.

Examples of the above non-aqueous solvent can include at least one aprotic solvent selected from carbonates, ethers, sulfones, lactones, and the like. Specifically, the above aprotic solvent that can be used is at least one solvent selected from ethylene carbonate (EC), propylene carbonate (PC), diethyl carbonate (DEC), dimethyl carbonate (DMC), ethyl methyl carbonate (EMC), 1,2-dimethoxyethane (DME), 1,2-diethoxyethane (DEE), tetrahydrofuran (THF), 2-methyltetrahydrofuran, dioxane, 1,3-dioxolane, diethylene glycol dimethyl ether, ethylene glycol dimethyl ether, acetonitrile (AN), propionitrile, nitromethane, N,N-dimethylformamide (DMF), dimethyl sulfoxide, sulfolane, y-butyrolactone, and the like.

The above electrolyte that can be used is at least one compound selected from $LiPF_6$, $LiBF_4$, $LiClO_4$, $LiN(SO_2CF_3)$, $LiN(SO_2C_2F_5)_2$, $LiCF_3SO_3$, $LiC_4F_9SO_3$, $LiC(SO_2CF_3)_3$, LiF, LiCl, LiI, $Li_2O$, $Li_3N$, $Li_3P$, $Li_{10}GeP_2S_{12}$ (LGPS), $Li_3PS_4$, $Li_6PS_5Cl$, $Li_7P_2S_8I$, $Li_xPO_yN_z$ (x=2y+3z−

5, LiPON), $Li_7La_3Zr_2O_{12}$ (LLZO), $Li_{3x}La_{2/3-x}TiO_3$ (LLTO), $Li_{1+x}Al_xTi_{2-x}(PO_4)_3$ (LATP), $Li_{1.5}Al_{0.5}Ge_{1.5}(PO_4)_3$ (LAGP), $Li_{1+x+y}Al_xTi_{2-x}Si_yP_{3-y}O_{12}$, $Li_{1+x+y}Al_x(Ti, Ge)_{2-x}Si_yP_{3-y}O_{12}$, $Li_{4-2x}Zn_xGeO_4$ (LISICON), and the like, and $LiPF_6$, $LiBF_4$, or a mixture thereof is preferable.

Examples of the separators 43 and 44 include films made of resins such as polyethylene (PE), polypropylene (PP), polyester, cellulose, polyamide, and the like, porous resin sheet such as non-woven fabric, or porous structure obtained by sintering an inorganic material or mixing with a binder. Examples of the inorganic material used for the above porous structure include alumina ($Al_2O_3$), silica ($SiO_2$), LiF, LiCl, LiI, $Li_2O$, $Li_2S$, $Li_3N$, $Li_3P$, $Li_{10}GeP_2S_{12}$ (LGPS), $Li_3PS_4$, $Li_6PS_5Cl$, $Li_7P_2S_8I$, $Li_xPO_yN_z$ (x=2y+3z−5, LiPON), $Li_7La_3Zr_2O_{12}$ (LLZO), $Li_{3x}La_{2/3-x}TiO_3$ (LLTO), $Li_{1+x}Al_xTi_{2-x}(PO_4)_3$ (LATP), $Li_{1.5}Al_{0.5}Ge_{1.5}(PO_4)_3$ (LAGP), $Li_{1+x+y}Al_xTi_{2-x}Si_yP_{3-y}O_{12}$, $Li_{1+x+y}Al_x(Ti, Ge)_{2-x}Si_yP_{3-y}O_{12}$, $Li_{4-2x}Zn_xGeO_4$ (LISICON), and the like.

The separators 43 and 44 can be configured by using at least one material selected from the above porous resin sheet or the above porous structure. The separators 43 and 44 have a single-layer structure when they consist of only one of the above materials, but may have a structure in which each material is laminated or in a mixed state when they are made of two or more materials, and the form is not particularly limited.

In the present embodiment, the non-aqueous electrolyte secondary battery 1 is configured by accommodating the electrode body element 40 in the battery container 2 made of an aluminum alloy having the battery can 4 having a square deep shape and the battery lid 3 for sealing the opening 4a of the battery can 4. However, the non-aqueous electrolyte secondary battery 1 is not limited to the configuration of the present embodiment, and the material such as aluminum, steel, and stainless steel can be used, and the container shape such as a cylindrical shape, a square shape, a coin cell, and a pouch (laminate) can be used.

In addition, in the present embodiment, as the electricity shut-off mechanism, the diaphragm portion 68a is used to deform in response to an increase in the internal pressure of the battery container 2 and to break the fragile portion 25 of the positive electrode current collector plate 21, and the electricity shut-off mechanism may have any configuration as long as it can shut off the energization between the in-container positive electrode terminals 21 and 23 or the in-container negative electrode terminals 22 and 24 and the outside of the container in response to the increase in the internal pressure of the battery container 2. The operating pressure of the above electricity shut-off mechanism can be, for example, in the range of 0.1 to 5 MPa, and preferably in the range of 0.5 to 2.2 MPa.

Examples and Comparative Examples of the present invention will be shown as follows.

EXAMPLES

Example 1

In the present Example, a positive electrode slurry was prepared by mixing $LiNi_xCo_yMn_zO_2$ (x+y+z=1, x:y:z=6:2:2, hereinafter abbreviated as NCM622) as a positive electrode active material, acetylene black (AB) as a conductive aid, and polyvinylidene fluoride (PVdF) as a binder in N-methylpyrrolidone (NMP) in the mass ratio of NCM622:AB:PFdV=94:3:3, and by adjusting the solid content ratio to 55% by mass. An aluminum foil having a thickness of 15 µm was used as a positive electrode current collector, and the above positive electrode slurry was applied to the positive electrode current collector and dried to form a 24 mg/cm² positive electrode mixture layer 41a.

A solid electrolyte layer slurry was prepared by mixing $Li_{1+x}Al_xTi_{2-x}(PO_4)_3$ (LATP) as a solid electrolyte used as a gas generator, acetylene black (AB) as a conductive aid, and polyvinylidene fluoride (PVdF) as a binder in N-methylpyrrolidone (NMP) in the mass ratio of LATP:AB:PVdF=94:3:3, and by adjusting the solid content ratio to 55% by mass. The above solid electrolyte layer slurry was applied to the positive electrode mixture layer unformed portion 41b of the above positive electrode current collector and dried to form a 12 mg/cm² solid electrolyte layer that produces gas (hereinafter, may be abbreviated as solid electrolyte layer).

The above positive electrode current collector comprising the positive electrode mixture layer 41a and the above solid electrolyte layer was dried and pressed, and the electrode density of the positive electrode mixture layer 41a was adjusted to 3.2 g/cm³ to form the positive electrode 41.

A negative electrode slurry was prepared by mixing graphite powder (Gr.) as a negative electrode active material and styrene-butadiene rubber (SBR) and carboxymethyl cellulose (CMC) as a binder in pure water in the mass ratio of Gr.:SBR:CMC=98:1:1, and by adjusting the solid content ratio to 50% by mass. A copper foil having a thickness of 8 µm was used as a negative electrode current collector, and the above negative electrode slurry was applied to the negative electrode current collector and dried to form a 22 mg/cm² negative electrode mixture layer 42a. The above negative electrode current collector comprising the negative electrode mixture layer 42a was dried and pressed, and the electrode density of the negative electrode mixture layer 42a was adjusted to 1.5 g/cm³ to form a negative electrode 42.

As shown in FIG. 3, the positive electrode 41 and the negative electrode 42 were arranged between the separators 43 and 44 having a two-layer structure of alumina ($Al_2O_3$) and polyethylene (PE), respectively, and wound in a flat shape to form an electrode body element 40. The end of the positive electrode current collector of the electrode body element 40 was joined to the joint piece 23 of the positive electrode current collector plate 21, and the end of the negative electrode current collector to the joint piece 33 of the negative electrode current collector plate 31 by ultrasonic welding respectively to form a power generation element assembly 5.

The electrode body element 40 was covered with an insulating sheet (not shown) and inserted into the battery can 4, and the opening 4a of the battery can 4 was closed with the battery lid 3, and the battery lid 3 was joined to the battery can 4 by laser welding and sealed. The electrolytic solution was injected into the battery container 2 from the liquid injection port 12, and the liquid injection port 12 was closed with the liquid injection plug 11 and joined to the battery lid 3 by laser welding and sealed, thereby forming the lithium ion secondary battery 1. As the above electrolytic solution, used was a non-aqueous electrolyte obtained by dissolving $LiPF_6$ as a supporting salt at a concentration of 1.2 mol/L in a mixed solvent that had been mixed with ethylene carbonate (EC), ethyl methyl carbonate (EMC), and dimethyl carbonate (DMC) in a volume ratio of EC:EMC:DMC=3:4:3.

For the lithium ion secondary battery 1 obtained in the present Example, the element energy density was calculated from the battery capacity in the range of 2.5 to 4.2 V at a current value equivalent to 0.33 C. The result is shown in Table 1.

For the lithium ion secondary battery 1 obtained in the present Example, the overcharge test of twice the maximum battery capacity (SOC200%) was performed with a current value equivalent to 1C, and the overcharge SOC and voltage at the pressure operating the electricity shut-off mechanism were measured. The result is shown in Table 1.

Comparative Example 1

In the present Comparative Example, the lithium ion secondary battery 1 was formed in exactly the same manner as in Example 1 except that the solid electrolyte layer to produce gas was not formed.

For the lithium ion secondary battery 1 obtained in the present Comparative Example, while calculating the element energy density in exactly the same manner as in Example 1, the overcharge SOC and voltage at the pressure operating the electricity shut-off mechanism were measured. The result is shown in Table 1.

Example 2

In the present Example, the lithium ion secondary battery 1 was formed in exactly the same manner as in Example 1 except that the negative electrode 42 and the electrolytic solution were as follows.

A negative electrode slurry was prepared by mixing lithium titanate (LTO) as a negative electrode active material, acetylene black (AB) as a conductive aid, and polyvinylidene fluoride (PVdF) as a binder in N-methylpyrrolidone (NMP) in the mass ratio of LTO:AB:PVdF=96:2:2, and then by adjusting the solid content ratio to 55% by mass. An aluminum foil having a thickness of 15 μm was used as a negative electrode current collector, and the negative electrode slurry was applied to the negative electrode current collector to form a 42 mg/cm$^2$ negative electrode mixture layer 42a. The above negative electrode current collector comprising the negative electrode mixture layer 42a was dried and pressed, and the electrode density of the negative electrode mixture layer 42a was adjusted to 2.1 g/cm$^3$ to form the negative electrode 42.

A non-aqueous electrolyte was formed by dissolving LiPF$_6$ as a supporting salt at a concentration of 1.2 mol/L in a mixed solvent that had been mixed with propylene carbonate (PC) and diethyl carbonate (DEC) as the electrolytic solution in a volume ratio of PC:DEC=2:1.

For the lithium ion secondary battery 1 obtained in the present Example, while calculating the element energy density from the battery capacity in the range of 1.5 to 2.7 V at a current value equivalent to 0.33 C, the overcharge SOC and voltage at the pressure operating the electricity shut-off mechanism were measured in exactly the same manner as in Example 1. The result is shown in Table 1.

Example 3

In the present Example, the lithium ion secondary battery 1 was formed in exactly the same manner as in Example 1 except that the negative electrode 42 and the electrolytic solution were formed in exactly the same manner as in Example 2, and the solid electrolyte layer to produce gas was as follows.

A solid electrolyte layer slurry was prepared by mixing Li$_{4-2x}$Zn$_x$GeO$_4$ (LISICON) as a solid electrolyte used as a gas generator, acetylene black (AB) as a conductive aid, polyvinylidene fluoride (PVdF) as a binder in N-methylpyrrolidone (NMP) in the mass ratio of LISICON:AB:PVdF=94:3:3, and then by adjusting the solid content ratio to 55% by mass. The above solid electrolyte layer slurry was applied to the negative electrode mixture layer unformed portion 42b of the negative electrode current collector to form a 11 mg/cm$^2$ solid electrolyte layer to produce gas.

For the lithium ion secondary battery 1 obtained in the present Comparative Example, while calculating the element energy density in exactly the same manner as in Example 2, the overcharge SOC and voltage at the pressure operating the electricity shut-off mechanism were measured. The result is shown in Table 1.

Comparative Example 2

In the present Comparative Example, the lithium ion secondary battery 1 was formed in exactly the same manner as in Example 2 except that the solid electrolyte layer to produce gas was not formed.

For the lithium ion secondary battery 1 obtained in the present Comparative Example, while calculating the element energy density in exactly the same manner as in Example 2, the overcharge SOC and voltage at the pressure operating the electricity shut-off mechanism were measured. The result is shown in Table 1.

TABLE 1

| | Positive electrode active material | Negative electrode active material | Solid electrolyte layer Positive electrode side | Solid electrolyte layer Negative electrode side | Element volume energy density | Electricity shut-off mechanism Operating SOC | Electricity shut-off mechanism Operating voltage |
|---|---|---|---|---|---|---|---|
| Example 1 | NCM622 | Gr. | LATP | — | 412 | 150 | 4.5 |
| Comparative Example 1 | NCM622 | Gr. | — | — | 412 | 160 | 5.2 |
| Example 2 | NCM622 | LTO | LATP | — | 253 | 138 | 4.4 |
| Example 3 | NCM622 | LTO | — | LISICON | 253 | 136 | 4.3 |
| Comparative Example 2 | NCM622 | LTO | — | — | 253 | 148 | 4.9 |

NCM622: LiNi$_x$Co$_y$Mn$_z$O$_2$ (x + y + z = 1, x:y:z = 6:2:2)
Gr.: Graphite powder
LTO: Lithium titanate
LATP: Li$_{1+x}$Al$_x$Ti$_{2-x}$(PO$_4$)$_3$
LISICON: Li$_{4-2x}$Zn$_x$GeO$_4$
Element volume energy density: Wh/L
Operating SOC: %
Operating voltage: V From Table 1, according to the lithium ion secondary batteries of Examples 1 to 3, comprising the solid electrolyte layer to produce gas in the positive electrode mixture layer unformed portion 41b or the negative electrode mixture layer unformed portion 42b, compared to the lithium ion secondary batteries of Comparative Examples 1 and 2, comprising no solid electrolyte layer to produce gas, the operating SOC and operating voltage of the electricity shut-off mechanism are low although the element volume energy density is the same, and therefore it is clear that the electricity shut-off mechanism can be reliably operated at overcharging without deteriorating the battery performance.

REFERENCE SIGNS LIST

1: Non-aqueous electrolyte secondary battery, 2: Battery container, 21 and 23: In-container positive electrode terminal, 22 and 24: In-container negative electrode terminal, 41: Positive electrode, 41a: Positive electrode mixture layer, 41b: Positive electrode mixture layer unformed portion, 42: Negative electrode, 42a: Negative electrode mixture layer, 42b: Negative electrode mixture layer unformed portion, and 68a: Diaphragm portion (electricity shut-off mechanism).

The invention claimed is:

1. A non-aqueous electrolyte secondary battery comprising, in a container:
    a positive electrode having a positive electrode mixture layer and a positive electrode current collector;
    an in-container positive electrode terminal that is electrically connected to a positive electrode mixture layer unformed portion of the positive electrode current collector;
    a negative electrode having a negative electrode mixture layer and a negative electrode current collector;
    an in-container negative electrode terminal that is electrically connected to a negative electrode mixture layer unformed portion of the negative electrode current collector;
    a non-aqueous electrolyte solution; and
    an electricity shut-off mechanism capable of shutting off energization between the in-container positive electrode terminal or the in-container negative electrode terminal and an outside of the container when an internal pressure of the container rises,
    wherein a solid electrolyte layer that produces gas is comprised in at least one member selected from a group consisting of the positive electrode mixture layer unformed portion, the negative electrode mixture layer unformed portion, the in-container positive electrode terminal, and the in-container negative electrode terminal, the gas allowing the electricity shut-off mechanism to be operated by reacting with a voltage equal to or more than a maximum operating power of the non-aqueous electrolyte secondary battery and then by raising the internal pressure of the container.

2. The non-aqueous electrolyte secondary battery according to claim 1, wherein the electricity shut-off mechanism comprises a shape-variable member that can deform its shape when the internal pressure of the container rises, and the energization between the in-container positive electrode terminal or the in-container negative electrode terminal and the outside of the container is shut off due to breaking of a fragile portion in deformation of the shape-variable member.

3. The non-aqueous electrolyte secondary battery according to claim 2, wherein the shape-variable is a diaphragm.

4. The non-aqueous electrolyte secondary battery according to claim 1, wherein the solid electrolyte layer is at least one material selected from LiF, LiCl, LiI, $Li_2O$, $Li_2S$, $Li_3N$, $Li_3P$, $Li_{10}GeP_2S_{12}$ (LGPS), $Li_3PS_4$, $Li_6PS_5Cl$, $Li_7P_2S_8I$, $Li_xPO_yN_z$ (x=2y+3z−5, LiPON), $Li_7La_3Zr_2O_{12}$ (LLZO), $Li_{3x}La_{2/3-x}TiO_3$ (LLTO), $Li_{1+x}Al_xTi_{2-x}(PO_4)_3$ (LATP), $Li_{1.5}Al_{0.5}Ge_{1.5}(PO_4)_3$ (LAGP), $Li_{1+x+y}Al_xTi_{2-x}Si_yP_{3-y}O_{12}$, $Li_{1+x+y}Al_x(Ti, Ge)_{2-x}Si_yP_{3-y}O_{12}$, and $Li_{4-2x}Zn_xGeO_4$ (LISICON).

5. The non-aqueous electrolyte secondary battery according to claim 1, wherein the solid electrolyte layer is formed on the positive electrode mixture layer unformed portion or the positive electrode terminal.

6. The non-aqueous electrolyte secondary battery according to claim 5, wherein the solid electrolyte layer is at least one material selected from $Li_{1.5}Al_{0.5}Ge_{1.5}(PO_4)_3$ (LAGP), $Li_7La_3Zr_2O_{12}$ (LLZO), or $Li_{1+x}Al_xTi_{2-x}(PO_4)_3$ (LATP).

7. The non-aqueous electrolyte secondary battery according to claim 1, wherein the solid electrolyte layer is formed on the negative electrode mixture layer unformed portion or the negative electrode terminal.

8. The non-aqueous electrolyte secondary battery according to claim 7, wherein the solid electrolyte layer is $Li_{4-2x}Zn_xGeO_4$ (LISICON).

* * * * *